Figure 1:
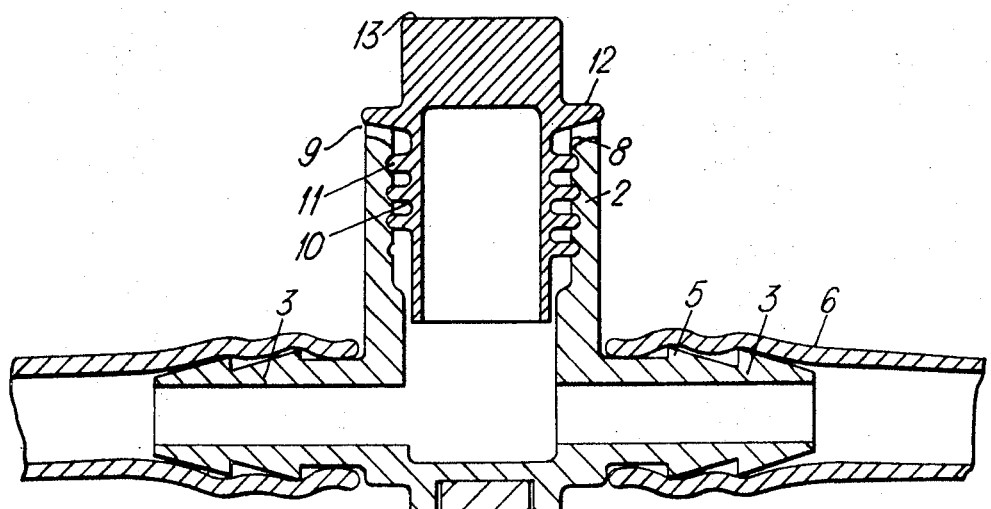

United States Patent

[11] 3,586,239

| [72] | Inventor | Ischajahu Blass |
| | | 26 Rehov Manneh, Tel Aviv, Israel |
| [21] | Appl. No. | 819,313 |
| [22] | Filed | Apr. 25, 1969 |
| [45] | Patented | June 22, 1971 |
| [32] | Priority | May 3, 1968 |
| [33] | | Israel |
| [31] | | 29,926 |

[54] IRRIGATION SPRAY UNIT
3 Claims, 2 Drawing Figs.

[52] U.S. Cl. .................................................. 239/276,
239/487, 239/514, 239/542
[51] Int. Cl. ................................................... B05b 1/02
[50] Field of Search .......................................... 239/204,
205, 487, 488, 513, 514, 273, 276, 542

[56] References Cited
UNITED STATES PATENTS

| 1,830,833 | 11/1931 | Green.......................... | 239/457 |
| 2,075,589 | 3/1937 | Munz........................... | 239/204 X |
| 2,709,623 | 5/1955 | Glynn........................... | 239/488 |
| 2,752,201 | 6/1956 | Blass............................ | 239/488 X |
| 2,968,440 | 1/1961 | Cone............................ | 239/456 X |

Primary Examiner—Lloyd L. King
Assistant Examiner—Michael Y. Mar
Attorney—Arthur B. Colvin ABSTRACT: An irrigation spray unit for use in irrigation and designed to ensure a low range spray of water therefrom with a low rate of supply unit being adapted to be coupled to an irrigation feed pipe in which the water flows at supply mains pressure, the unit serving to reduce the supply pressure to a very low level and to divide the incoming stream into a plurality of outflowing low range sprays.

PATENTED JUN22 1971      3,586,239

Inventor
ISCHAJAHU BLASS

By
*Attorney*

IRRIGATION SPRAY UNIT

This invention relates to an irrigation spray unit for use in irrigation and designed to ensure a low range spray of water therefrom at a low rate of supply. Such a spray unit will hereinafter be referred to as "an irrigation spray unit of the kind specified."

It is an object of the present invention to provide a new and improved form of irrigation spray unit of the kind specified.

According to the present invention there is provided an irrigation spray unit adapted to be coupled to an irrigation feedpipe in which water flows at supply mains pressure and comprising a main pressure reducing means adapted to reduce the pressure of a unitary stream flowing through the unit to a fraction of the supply pressure and auxiliary pressure reducing means serving still further to reduce the pressure of the stream and to divide it into a plurality of outflowing low range sprays.

Preferably the irrigation spray unit comprises inner and outer tubular members adapted to fit one within the other so as to define between them an elongated helical conduit, means for coupling the unit to an irrigation feedpipe, a unit inlet communicating with one end of the conduit and a plurality of unit outlets communicating with the other end of the conduit, the location and distribution of the unit outlet being such that water flowing through said conduit is subjected to a sharp diversion of direction upon emerging through said outlets.

A plurality of spray units in accordance with the present invention can be coupled at spaced intervals to an irrigation feedpipe which can be directly coupled to the supply mains and in consequence the water reaches each unit at the normal supply pressure of 2 to 4 atm. In consequence the irrigation feedpipe can be laid along undulating surfaces and yet a low range spray will be obtained even along steep inclines.

Most of the normal supply pressure will be reduced by the main pressure reducing means and the remaining fractional pressure (about 0.1 atm.) will be still further reduced by the auxiliary means resulting in the production of the low range sprays.

In consequence a low pressure spray will emerge having a relatively low range (e.g. between 1—1.5 m.) and the total supply of the unit will be low, e.g. 5—10 litres per hour. Furthermore the spray emerges from outlets which can be relatively large (e.g. about 0.5 mm.) and thereby minimizing the danger of the holes becoming blocked by soil etc.

With a normal spray unit such a low rate of delivery of water would, for example, require the provision of an outlet hole of a diameter of the order of tenths of a mm. and such an outlet hole could easily become blocked.

Figure 2:
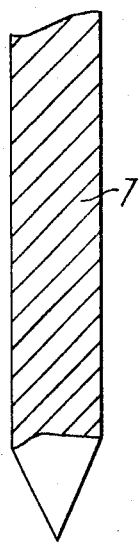
Figure 2:
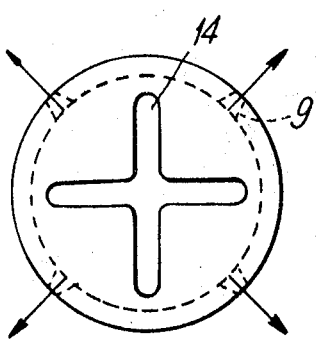

One embodiment of an irrigation spray unit in accordance with the present invention will now be described by way of an example and with reference to the accompanying drawings, in which:

FIG. 1 is a longitudinally sectioned view of a spray unit shown fitted into a main irrigation feedpipe, and FIG. 2 is a plan view of the unit shown in FIG. 1.

As seen in the drawings, the irrigation spray unit 1 comprises an outer tubular member 2 having a pair of tubular side arms 3 and a tubular, downwardly extending extension 4. The side arms 3 are formed with barbed serrations 5 and are insertable into opposite ends of an irrigation feedpipe 6. An elongated fixing pin 7 is secured at its upper end in the tubular extension 4 and is insertable into the ground thereby retaining the unit 1 in the desired position.

The upper portion of the outer tubular member 2 is formed with an internal screw threading 8 whilst the upper rim of the outer tubular member 2 is formed with a plurality of equiangularly distributed slots 9. An inner tubular member 10 is formed with a coarse external threading 11 and is integral with an outwardly directed flange 12 and a cap 13 formed with turning ribs 14.

As can be seen in FIG. 1 of the drawings when the inner tubular member 10 is screw inserted into the outer tubular member 2, a helical conduit 14 is formed between the two members 2 and 10, this helical conduit 14 communicating at its lower end with a unit inlet defined within the tubular arms 3 and at its upper end with unit outlets defined by the slots 9 and the superimposed flange 12. The flange 12 serves to protect the outlets against blocking by dirt, etc.

It can be readily seen that the unit outlets are directed transversely to the direction of flow of water through the helical conduit. In consequence water which flows through the irrigation feedpipe 6 is subjected to two consecutive pressure reductions. The first is as a result of the flow of the water through the elongated narrow conduit 14 and the second is as a result of the sharp diversion of the water flowing from the elongated conduit and through the transversely directed outlet.

The unit described above can suitably be formed of a cast or moulded plastic material and can be readily assembled and disassembled for servicing or replacement.

Whilst in the arrangement specifically described above the first pressure reduction has been constituted by an elongated helical conduit, it will be realized that other forms of pressure reducing means can be employed, such as for example, a pressure reducing nozzle.

I claim:

1. An irrigation spray unit adapted to be coupled to an irrigation feedpipe in which water flows at supply main pressure and comprising an outer tubular member, an inner member adapted to fit within the outer member so as to define between them an elongated helical conduit constituting a main pressure reducing means adapted to reduce the pressure of a unitary stream flowing through the unit to a fraction of the supply pressure, means for coupling the unit to the irrigation feedpipe, a unit inlet communicating with one end of the conduit and a plurality of unit outlets, formed in a sidewall of the unit and communicating with the other end of the conduit, the location and distribution of the unit outlets being such that water flowing through said conduit is subjected to a sharp diversion of direction upon emerging through said outlets thereby constituting auxiliary pressure reducing means serving still further to reduce the pressure of the stream and to divide it into a plurality of discrete outflowing low range sprays.

2. A spray unit according to claim 1, wherein said outlets are defined by slots formed in the rim of one of the members and a flange formed integrally with the other member.

3. A spray unit according to claim 1 wherein said outer tubular member is formed integrally with a pair of tubular branch arms adapted to be fitted to an irrigation feedpipe.